US012654725B2

(12) United States Patent
Zeng et al.

(10) Patent No.: US 12,654,725 B2
(45) Date of Patent: Jun. 16, 2026

(54) REAL-TIME CONTROL SELECTION AND CALIBRATION USING NEURAL NETWORK

(71) Applicant: GM Global Technology Operations LLC, Detroit, MI (US)

(72) Inventors: Shuqing Zeng, Sterling Heights, MI (US); Yubiao Zhang, Sterling Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 859 days.

(21) Appl. No.: 18/060,049

(22) Filed: Nov. 30, 2022

(65) Prior Publication Data

US 2024/0174243 A1     May 30, 2024

(51) Int. Cl.
*B60W 50/06* (2006.01)
*B60W 50/00* (2006.01)
*B60W 50/04* (2006.01)

(52) U.S. Cl.
CPC .......... *B60W 50/06* (2013.01); *B60W 50/045* (2013.01); *B60W 2050/0088* (2013.01); *B60W 2050/041* (2013.01)

(58) Field of Classification Search
CPC .............. B60W 50/06; B60W 50/045; B60W 2050/0088; B60W 2050/041; B60W 2552/40; B60W 30/02
See application file for complete search history.

(56) References Cited

U.S. PATENT DOCUMENTS

| | | | |
|---|---|---|---|
| 7,330,785 B2 | 2/2008 | Odenthal et al. | |
| 10,124,807 B2 | 11/2018 | Petrucci et al. | |
| 10,407,035 B1 | 9/2019 | Gadda et al. | |
| 2006/0267750 A1 | 11/2006 | Lu et al. | |
| 2020/0225676 A1* | 7/2020 | Telpaz ................. | B60W 40/09 |
| 2020/0339109 A1* | 10/2020 | Hong .................. | G06F 11/3698 |
| 2021/0012236 A1* | 1/2021 | Carrasco ............. | G06N 3/0985 |
| 2021/0295726 A1* | 9/2021 | Krishnamoorthy .. | H04N 21/234 |
| 2022/0217645 A1* | 7/2022 | Gupta ................. | H04W 52/146 |

(Continued)

OTHER PUBLICATIONS

United States Patent and Trademark Office. U.S. Appl. No. 17/518,237, filed Nov. 3, 2021.

(Continued)

*Primary Examiner* — Kurt Philip Liethen
(74) *Attorney, Agent, or Firm* — Vivacqua Crane, PLLC

(57)     ABSTRACT

A system for real-time control selection and calibration in a vehicle using a deep-Q network (DQN) includes sensors and actuators disposed on the vehicle. A control module has a processor, memory, and input/output (I/O) ports in communication with the one or more sensors and the one or more actuators. The processor executes program code portions that cause the sensors actuators to obtain vehicle dynamics and road surface estimation information and utilize the vehicle dynamics information and road surface estimation information to generate a vehicle dynamical context. The system decides which one of a plurality of predefined calibrations is appropriate for the vehicle dynamical context, generates a command to the actuators based on a selected calibration. The system continuously and recursively causes the program code portions to execute while the vehicle is being operated.

18 Claims, 6 Drawing Sheets

(56) References Cited

U.S. PATENT DOCUMENTS

| | | | | |
|---|---|---|---|---|
| 2022/0242422 A1* | 8/2022 | Thompson | ............. | G08G 1/166 |
| 2022/0266852 A1* | 8/2022 | Khayyer | ............... | B60W 40/08 |
| 2023/0058568 A1* | 2/2023 | Wang | ................... | B60W 40/10 |
| 2024/0039788 A1* | 2/2024 | Nassar | ................... | H04L 41/16 |
| 2024/0053736 A1* | 2/2024 | Inam | .................... | G06F 9/5027 |

OTHER PUBLICATIONS

United States Patent and Trademark Office. U.S. Appl. No. 17/518,244, filed Nov. 3, 2021.

* cited by examiner

REAL-TIME CONTROL SELECTION AND CALIBRATION USING NEURAL NETWORK

INTRODUCTION

The present disclosure relates to vehicle motion control systems, and more specifically to systems and methods for learning vehicle dynamic behavior and control performance.

Vehicle motion control systems manage vehicle performance in longitudinal and lateral acceleration, pitch, roll, and yaw in a wide variety of ambient and road surface conditions. Such vehicle motion control systems are complex with large numbers of functions interacting with one another. Some current vehicle motion control systems and methods utilize model predictive control (MPC) systems and methodology. However, current systems and methods for managing vehicle motion control can have high computational burdens when presented with a wide variety of control parameters in a wide variety of different use cases. Tuning the control parameters can also be labor intensive and as vehicle control systems become more complex with greater and greater quantities of actuators, the addition of such additional actuators further exacerbates tuning complexity issues. Moreover, as a vehicle ages, tire and other component wear, weight distribution changes, and the like can alter vehicle chassis dynamics significantly.

Accordingly, while current vehicle motion control systems achieve their intended purpose, there is a need for new and improved systems and methods for real-time control selection and calibration which reduce the burden on computational resources, increase reliability and robustness and redundancy of the system, provide a means to mitigate deterioration of system components and failures while maintaining or reducing complexity, and which improve vehicle motion control capabilities.

SUMMARY

According to several aspects of the present disclosure a system for real-time control selection and calibration in a vehicle using a deep-Q network (DQN) includes one or more sensors disposed on the vehicle, the one or more of sensors measuring real-time static and dynamic data about the vehicle, and one or more actuators disposed on the vehicle, the one or more actuators altering static and dynamic characteristics of the vehicle. The system further includes one or more control modules each having a processor, a memory, and input/output (I/O) ports in communication with the one or more sensors and the one or more actuators. The processor executes program code portions stored in the memory. The program code portions include: a first program code portion that causes the one or more sensors and the one or more actuators to obtain vehicle dynamics information and road surface estimation information, and a second program code portion that utilizes the vehicle dynamics information and road surface estimation information to generate a vehicle dynamical context. The program code portions further include a third program code portion that decides which one of a plurality of predefined calibrations is appropriate for the vehicle dynamical context, and a fourth program code portion that generates an actuator command to the one or more actuators based on a selected one of the plurality of predefined calibrations. A fifth program code portion continuously and recursively causes the one or more sensors and the one or more actuators to send vehicle dynamics and road surface estimation information to second program code portion and causes the third, fourth, and fifth program code portions to execute while the vehicle is being operated.

In another aspect of the present disclosure the second program code portion further includes program code that: builds the vehicle dynamical context by passing the vehicle dynamics information and the road surface information through a recurrent convolutional neural network (RCNN).

In another aspect of the present disclosure the plurality of predefined calibrations further include one or more of: a plurality of MPC modules, each of the plurality of MPC modules defining program code portions having a predictor and a controller, the predictor containing actuator settings, and the controller executing the actuator settings of the predictor to produce an actuator command; and a plurality of actuator calibrations stored in memory and executed by a single controller to produce an actuator command.

In another aspect of the present disclosure the third program code portion further includes program code that: decides which one of the plurality of predefined calibrations is appropriate for a current vehicle dynamical context by passing the vehicle dynamical context through the DQN, applying a key performance indicator (KPI) reward $r(n)$ to the vehicle dynamical context and selecting a calibration having a maximum possible value among the plurality of predefined calibrations.

In another aspect of the present disclosure the third program code portion further includes program code that: partitions vehicle dynamics information and road surface information into episodic time frames having a predefined duration; evaluates calibration selection decisions based on performance indices; and computes a weighted sum of performance indices as the reward $r(n)$.

In another aspect of the present disclosure the performance indices include: tracking error, energy consumption, and current vehicle dynamic state information.

In another aspect of the present disclosure the third program code portion further includes program code that: refine the vehicle dynamical context by passing the vehicle dynamical context through the DQN, the DQN having multiple fully-connected layers; generate an expected Q-value $Q(a,\theta)$, where $a$ is the calibration selected, and $\theta$ is a weight to be learned; and tune the $\theta$ such that a function: $\|Q'(a,\theta)-(r+\gamma \max a Q(a,\theta))\|$ is minimized, where $\gamma$ is a discounting factor that increases with time, and $r(n)$ is a reward received; wherein $r(n)$ is large when the calibration selected achieves a desired vehicle dynamics state, and $r(n)$ is small when the calibration selected does not achieve the desired vehicle dynamics state.

In another aspect of the present disclosure the third program code portion further includes: a training phase. In the training phase: the DQN is initialized with randomized weights. The randomized weights are applied to each of the plurality of predefined calibrations. DQN', defining a value of DQN during a current time step, is set to a value of DQN, and for each episodic time frame, a reward $r(n)$ is calculated and DQN' is trained to minimize $\|Q'(a,\theta)-(r+\gamma \max a Q(a,\theta))\|$. The values of DQN and DQN' are compared; and upon determining that the values of DQN and DQN' have converged, the value of DQN is set to DQN', and upon determining the values of DQN and DQN' have not converged, a new reward $r(n)$ is calculated and a new DQN' value is trained to minimize $\|Q'(a,\theta)-(r+\gamma \max a Q(a,\theta))\|$ recursively.

In another aspect of the present disclosure the third program code portion further includes: an execution phase where upon determining that the values of DQN and DQN' have converged, a calibration corresponding to the value of DQN is selected.

In another aspect of the present disclosure a method for real-time control selection and calibration in a vehicle using a deep-Q network (DQN) including measuring, by one or more sensors disposed on the vehicle, real-time static and dynamic data about the vehicle and altering static and dynamic characteristics of the vehicle with one or more actuators disposed on the vehicle. The method further includes utilizing one or more control modules each having a processor, a memory, and input/output (I/O) ports in communication with the one or more sensors and the one or more actuators, the processor executing program code portions stored in the memory. The program code portions: cause the one or more sensors and the one or more actuators to obtain vehicle dynamics information and road surface estimation information, generate a vehicle dynamical context from vehicle dynamics information and road surface estimation information, and decide which one of a plurality of predefined calibrations is appropriate for the vehicle dynamical context. The program code portions also generate an actuator command to the one or more actuators based on a selected one of the plurality of predefined calibrations, and continuously and recursively obtain the vehicle dynamics and road surface estimation information. The program code portions generate the vehicle dynamical context, decide which one of the plurality of predefined calibrations is appropriate, and generate an actuator command based on a selected one of the plurality of predefined calibrations while the vehicle is being operated.

In another aspect of the present disclosure generating the vehicle dynamical context further includes: building the vehicle dynamical context by passing the vehicle dynamics information and the road surface information through a recurrent convolutional neural network (RCNN).

In another aspect of the present disclosure deciding which one of a plurality of predefined calibrations is appropriate for the vehicle dynamical context further includes utilizing one or more of: a plurality of MPC modules, each of the plurality of MPC modules defining program code portions having a predictor and a controller, the predictor containing actuator settings, and the controller executing the actuator settings of the predictor to produce an actuator command; and a plurality of actuator calibrations stored in memory and executed by a single controller to produce an actuator command.

In another aspect of the present disclosure the method further includes deciding which one of the plurality of predefined calibrations is appropriate for a current vehicle dynamical context by passing the vehicle dynamical context through the DQN, applying a key performance indicator (KPI) reward r(n) to the vehicle dynamical context and selecting a calibration having a maximum possible value among the plurality of predefined calibrations.

In another aspect of the present disclosure the method further includes partitioning vehicle dynamics information and road surface information into episodic time frames having a predefined duration; evaluating calibration selection decisions based on performance indices; and computing a weighted sum of performance indices as the reward r(n).

In another aspect of the present disclosure evaluating calibration selection decisions further includes utilizing performance indices including tracking error, energy consumption, and current vehicle dynamic state information.

In another aspect of the present disclosure deciding which one of a plurality of predefined calibrations is appropriate for the vehicle dynamical context further includes: refining the vehicle dynamical context by passing the vehicle dynamical context through the DQN, the DQN having multiple fully-connected layers; generating an expected Q-value $Q(a,\theta)$, where a is the calibration selected, and $\theta$ is a weight to be learned; and tuning the $\theta$ such that a function: $\|Q'(a,\theta)-(r+\gamma maxaQ(a,\theta))\|$ is minimized, where $\gamma$ is a discounting factor that increases with time, and r(n) is a reward received; wherein r(n) is large when the calibration selected achieves a desired vehicle dynamics state, and r(n) is small when the calibration selected does not achieve the desired vehicle dynamics state.

In another aspect of the present disclosure deciding which one of a plurality of predefined calibrations is appropriate for the vehicle dynamical context further includes: executing a training phase, including: initializing the DQN with randomized weights. The randomized weights are applied to each of the plurality of predefined calibrations. The method further includes setting a value DQN' equal to DQN, where DQN' defines the value of DQN during a current time step; and calculating, for each episodic time frame, a reward r(n). The method further includes training DQN' to minimize $\|Q'(a,\theta)-(r+\gamma maxaQ(a,\theta))\|$; and comparing the values of DQN and DQN'. Upon determining that the values of DQN and DQN' have converged, the value of DQN is set to DON', and upon determining the values of DQN and DQN' have not converged, a new reward r(n) is calculated and a new DQN' value is trained to minimize $\|Q'(a,\theta)-(r+\gamma maxaQ(a,\theta))\|$ recursively.

In another aspect of the present disclosure deciding which one of a plurality of predefined calibrations is appropriate for the vehicle dynamical context further includes: executing an execution phase, where upon determining that the values of DQN and DQN' have converged, a calibration corresponding to the value of DQN is selected.

In another aspect of the present disclosure a system for real-time control selection and calibration in a vehicle using a deep-Q network (DQN) includes one or more sensors disposed on the vehicle, the one or more of sensors measuring real-time static and dynamic data about the vehicle, and one or more actuators disposed on the vehicle, the one or more actuators altering static and dynamic characteristics of the vehicle. The system further includes one or more control modules each having a processor, a memory, and input/output (I/O) ports in communication with the one or more sensors and the one or more actuators, the processor executing program code portions stored in the memory. The program code portions include: a first program code portion that causes the one or more sensors and the one or more actuators to obtain vehicle dynamics information and road surface estimation information, and a second program code portion that utilizes the vehicle dynamics information and road surface estimation information to generate a vehicle dynamical context. The vehicle dynamical context is generated by passing the vehicle dynamics information and the road surface information through a recurrent convolutional neural network (RCNN), the RCNN including a plurality of MPC modules, each of the plurality of MPC modules defining program code portions having a predictor and a controller, the predictor containing actuator settings, and the controller executing the actuator settings of the predictor to produce an actuator command; and a plurality of actuator calibrations stored in memory and executed by a single controller to produce an actuator command. The program code portions further include a third program code portion that decides which one of a plurality of predefined calibrations is appropriate for the vehicle dynamical context. The third program code portion decides which one of the plurality of predefined calibrations is appropriate for a current vehicle dynamical context by passing the vehicle dynamical context through the DQN, applies a key performance indicator (KPI) reward r(n) to the vehicle dynamical context and selects a calibration having a maximum possible value among the plurality of predefined calibrations. The third program code portion further partitions vehicle dynamics information and road surface information into episodic time frames having a predefined duration, evaluates calibration selection decisions based on performance indices, and computes a weighted sum of performance indices as the reward r(n). The performance indices include: tracking error, energy consumption, and current vehicle dynamic state information. The third program code portion refines the vehicle dynamical context by passing the vehicle dynamical context through the DQN, the DQN having multiple fully-connected layers; generates an expected Q-value $Q(a,\theta)$, where a is the calibration selected, and $\theta$ is a weight to be learned; and tunes the $\theta$ such that a function: $\|Q'(a,\theta)-(r+\gamma maxaQ(a,\theta))\|$ is minimized, where $\gamma$ is a discounting factor that increases with time, and r(n) is a reward received. r(n) is large when the calibration selected achieves a desired vehicle dynamics state, and r(n) is small when the calibration selected does not achieve the desired vehicle dynamics state. The program code portions further include a fourth program code portion that generates an actuator command to the one or more actuators based on the one of a selected one of the plurality of predefined calibrations; and a fifth program code portion that continuously and recursively causes the one or more sensors and the one or more actuators to send vehicle dynamics and road surface estimation information to second program code portion and causes the third, fourth, and fifth program code portions to execute while the vehicle is being operated.

In another aspect of the present disclosure the third program code portion further includes: a training phase, wherein in the training phase: the DQN is initialized with randomized weights. The randomized weights are applied to each of the plurality of predefined calibrations; DQN', defining the value of DQN during a current time step, is set to the value of DQN; and for each episodic time frame, a reward r(n) is calculated and DQN' is trained to minimize $\|Q'(a,\theta)-(r+\gamma maxaQ(a,\theta))\|$. The values of DQN and DQN' are compared. Upon determining that the values of DQN and DQN' have converged, the value of DQN is set to DQN', and upon determining the values of DQN and DQN' have not converged, a new reward r(n) is calculated and a new DQN' value is trained to minimize $\|Q'(a,\theta)-(r+\gamma maxaQ\ (a,\theta))\|$ recursively. The third program code portion further includes an execution phase where upon determining that the values of DQN and DQN' have converged, a calibration corresponding to the value of DQN is selected.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
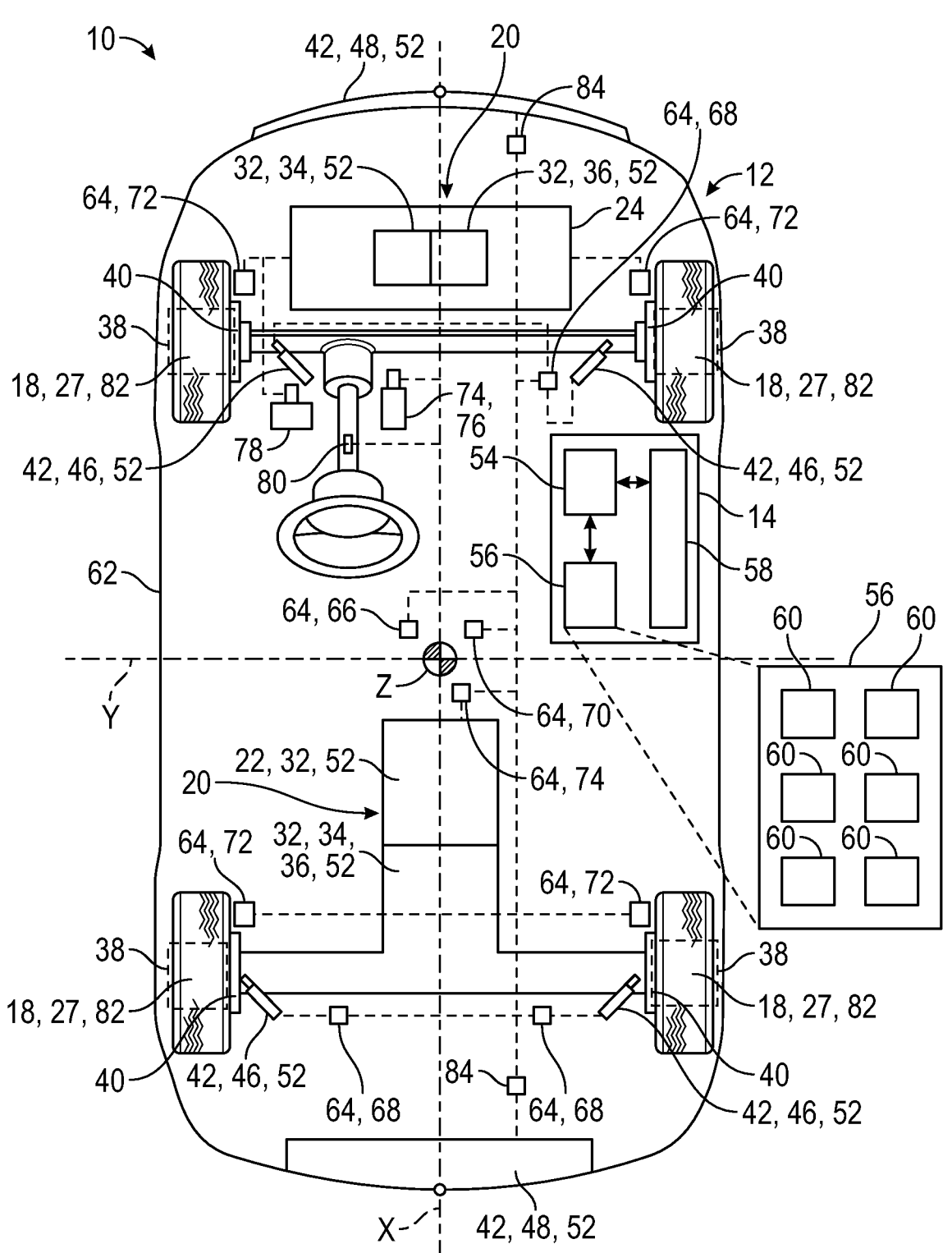
FIG. 1 is a schematic diagram of a vehicle having a system and method for real-time control selection and calibration using a Deep Q Network according to an aspect of the present disclosure.
Figure 2A:
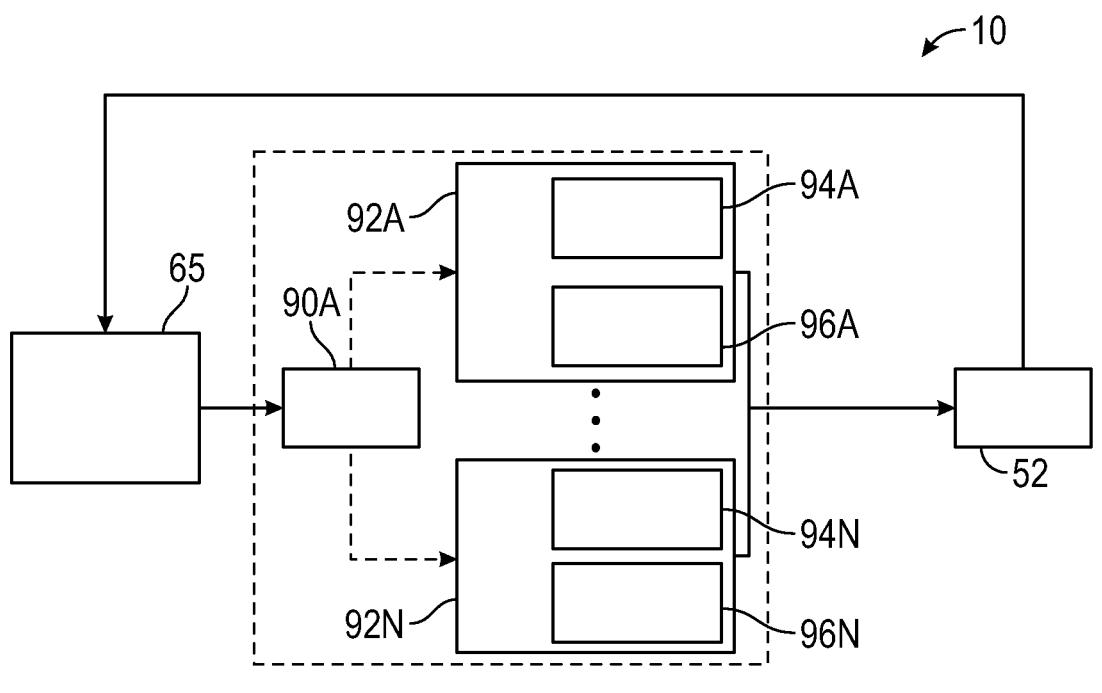
FIG. 2A is a block diagram depicting the system and method for real-time control selection and calibration using a Deep Q Network according to an aspect of the present disclosure.
Figure 2B:
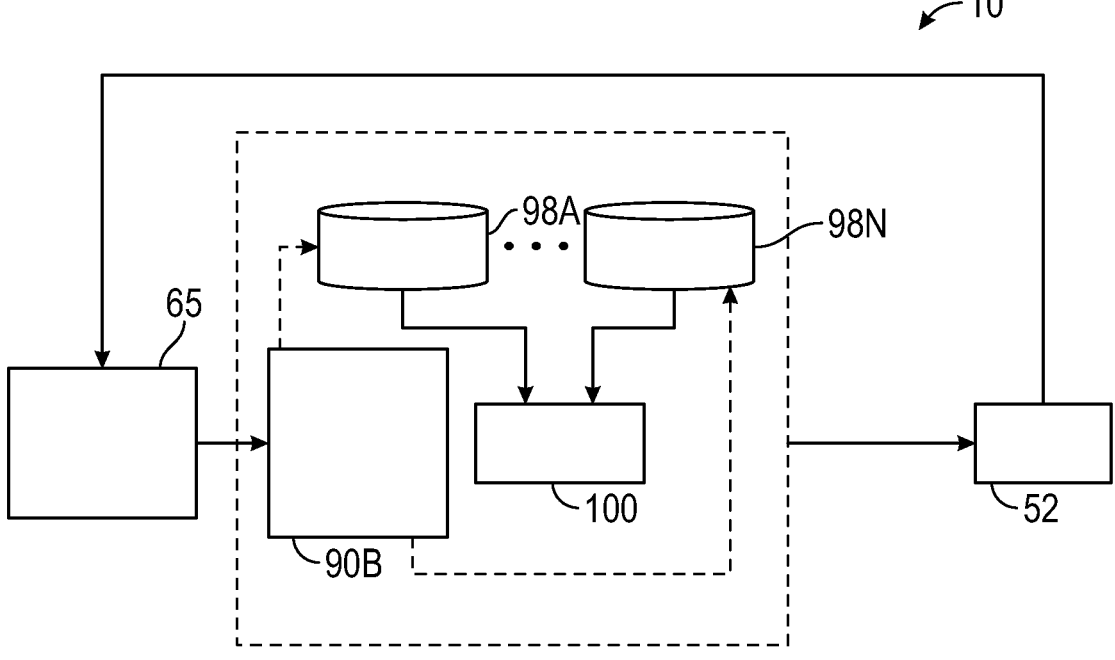
FIG. 2B is a block diagram depicting a variation of the system and method for real-time control selection and calibration using a Deep Q Network according to an aspect of the present disclosure.

Referring to FIGS. 1 and 2A—2B, a system 10 for learning-model predictive control with multi-step prediction for vehicle motion control (VMC) 10 is shown. The system 10 includes the motor vehicle 12 and one or more control modules 14. The motor vehicle 12 is shown as a car, but it should be appreciated that the motor vehicle 12 may be a van, bus, tractor-trailer, semi, Sport-Utility Vehicle (SUV), all-terrain vehicle (ATV), truck, tricycle, motorcycle, airplane, amphibious vehicle, or any other such vehicle which makes contact with the ground without departing from the scope or intent of the present disclosure. The motor vehicle 12 includes one or more wheels 27 having tires 18 and a drivetrain 20. The drivetrain may include a variety of components such as internal combustion engines (ICE) 22 and/or electric motors 24, and transmissions 26 capable of transmitting motive power developed by the ICEs 22 and/or electric motors 24 to the wheels 27, and ultimately to the tires 18 affixed thereto. In one example, the motor vehicle 12 may include an ICE 22 acting on a rear axle 28 of the motor vehicle 12 as well as one or more electric motors 24 acting on a front axle 30 of the motor vehicle 12. It should be appreciated, however, that the motor vehicle 12 may use one or more ICEs 22, and/or one or more electric motors 24 disposed in other configurations without departing from the scope or intent of the present disclosure. For example, the motor vehicle 12 may have an ICE 22 acting only on the front axle 30, while one or more electric motors 24 acts solely on the rear axle 28. In further examples, the ICE 22 may act on both front and rear axles 30, 28, and an electric motor may act on both front and rear axles 30, 28.

In several aspects, the drivetrain 20 includes one or more in-plane actuators 32. In-plane actuators 32 may include all-wheel drive (AWD) systems including electronically-controlled or electric AWD (eAWD) 34 systems as well as limited slip differentials (LSDs) including electronically-controlled or electric LSD (eLSD) 36 systems. In-plane actuators 32 including eAWD 34 and eLSD 36 systems can generate and/or modify force generation in X and/or Y directions at a tire 18 to road surface contact patch 38 within a certain predetermined capacity. An eAWD 34 system may transfer torque from front to rear of a motor vehicle 12 and/or from side-to-side of the motor vehicle 12. Likewise, an eLSD 36 system may transfer torque from side-to-side of the motor vehicle 12. In some examples, the eAWD 34 and/or eLSD 36 may directly alter or manage torque delivery from the ICE 22 and/or electric motors 24 and/or the eAWD 34 and eLSD 36 may act on a braking system 40 to adjust a quantity of torque delivered to each of the tires 18 of the motor vehicle 12.

In further examples, the motor vehicle 12 may include a means of altering a normal force on each of the tires 18 of the motor vehicle 12 via one or more out-of-plane actuators 42 such as active aerodynamic actuators 44 and/or active suspension actuators 46. The active aerodynamic actuators 44 may actively or passively alter an aerodynamic profile of the motor vehicle via one or more active aerodynamic elements 48 such as wings, spoilers, fans or other suction devices, actively-managed Venturi tunnels, and the like. The active suspension actuators 46 such as active dampers 50 or the like. In several aspects, the active dampers 50 may be magnetorheological dampers or other such electrically, hydraulically, or pneumatically-adjustable dampers without departing from the scope or intent of the present disclosure. For the sake of simplicity in the description that follows, ICEs 22, electric motors 24, eAWD 34, eLSD 36, the braking system 40, aerodynamic control system, active aerodynamic elements 48, active dampers 46, and the like will be referred to more broadly as actuators 52.

The terms "forward", "rear", "inner", "inwardly", "outer", "outwardly", "above", and "below" are terms used relative to the orientation of the motor vehicle 12 as shown in the drawings of the present application. Thus, "forward" refers to a direction toward a front of a motor vehicle 12, "rearward" refers to a direction toward a rear of a motor vehicle 12. "Left" refers to a direction towards a left-hand side of the motor vehicle 12 relative to the front of the motor vehicle 12. Similarly, "right" refers to a direction towards a right-hand side of the motor vehicle 12 relative to the front of the motor vehicle 12. "Inner" and "inwardly" refers to a direction towards the interior of a motor vehicle 12, and "outer" and "outwardly" refers to a direction towards the exterior of a motor vehicle 12, "below" refers to a direction towards the bottom of the motor vehicle 12, and "above" refers to a direction towards a top of the motor vehicle 12. Further, the terms "top", "overtop", "bottom", "side" and "above" are terms used relative to the orientation of the actuators 52, and the motor vehicle 12 more broadly shown in the drawings of the present application. Thus, while the orientation of actuators 52, or motor vehicle 12 may change with respect to a given use, these terms are intended to still apply relative to the orientation of the components of the system 10 and motor vehicle 12 components shown in the drawings.

The control modules 14 are non-generalized, electronic control devices having a preprogrammed digital computer or processor 54, non-transitory computer readable medium or memory 56 used to store data such as control logic, software applications, instructions, computer code, data, lookup tables, etc., and input/output (I/O) ports 58. Computer readable medium or memory 56 includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 56 excludes wired, wireless, optical, or other communication links that transport transitory electrical or other signals. A non-transitory computer readable memory 56 includes media where data can be permanently stored and media where data can be stored and later overwritten, such as a rewritable optical disc or an erasable memory device. Computer code includes any type of program code, including source code, object code, and executable code. The processor 54 is configured to execute the code or instructions. The motor vehicle 12 may have control modules 14 including a dedicated Wi-Fi controller or an engine control module, a transmission control module, a body control module, an infotainment control module, etc. The I/O ports 58 may be configured to communicate via wired communications, wirelessly via Wi-Fi protocols under IEEE 802.11x, or the like without departing from the scope or intent of the present disclosure.

The control module 14 further includes one or more applications 60. An application 60 is a software program configured to perform a specific function or set of functions. The application 60 may include one or more computer programs, software components, sets of instructions, procedures, functions, objects, classes, instances, related data, or a portion thereof adapted for implementation in a suitable computer readable program code. The applications 60 may be stored within the memory 56 or in additional or separate memory. Examples of the applications 60 include audio or video streaming services, games, browsers, social media, etc. In other examples, the applications 60 are used to manage body control system functions, suspension control system functions, aerodynamic control system functions, or the like in an exemplary motor vehicle 12.

The system 10 utilizes one or more applications 60, stored in memory 56 for managing chassis and driveline actuators 52 of the vehicle 12. In several aspects, the applications 60 include computer-executable program code portions that perform a variety of distinct and/or coordinated functions to manage vehicle motion control (VMC) actions. The computer control code portions operate using machine learning (ML) techniques to model each actuator's 52 functionality as well as the actuator's 52 impact on VMC through body 62 and wheel 27 dynamics, as well as through combined tire 18 slip models, or the like.

In some examples, the system 10 includes an ensemble of control algorithms 60 with each control algorithm 60 designed and adapted to handle specific use dynamical use cases, such as low-mu surfaces, sharp turns, and the like. In the particular example of FIG. 2A a recurrent convolutional neural network (RCNN) 65 takes measurements and estimations from vehicle sensors 64 and actuators 52. The vehicle sensors 64 may include any of a wide variety of sensors 64 detecting vehicle dynamics including, but not limited to: inertial measurement units (IMUs) 66, semi active damping suspension (SADS) sensors 68, global positioning system (GPS) sensors 70, wheel speed sensors 72, throttle position sensors 74, accelerator pedal position sensors 76, brake pedal position sensors 78, tire pressure monitoring sensors 82, optical and/or proximity sensors 84 such as RADAR sensors, LIDAR sensors, SONAR sensors, ultrasonic sensors and the like. Vehicle 12 and environmental context are ascertained from the various sensors 64, and the context is represented as a fixed length context vector 88 having a length that corresponds to the quantity of sensors 64 and sensor outputs. The vehicle dynamic context from the RCNN 65 is taken as an input to a decider control module 90A. In a more specific example, the decider control module 90A receives chassis status context and selects a model predictive control (MPC) module 92A-92N applicable to the chassis context to control the vehicle 12 via the actuators 52 of the vehicle 12. It should be appreciated that the MPC modules 92A-92N define algorithms stored in memory 56. More specifically, in accordance with the example shown in FIG. 2A, a single MPC module 92A-92N is active at a given point in time, and each MPC module 92A-92N defines a separate control algorithm 60 or computer executable control logic that is executed by the system 10 to adapt vehicle 12 dynamics to a particular set of environmental and/or dynamical conditions.

For example, as shown in FIG. 2A, a first MPC module 92A contains a first prediction 94A including actuator 52 settings executable via a first controller 96A that are adapted to provide desired vehicle 12 dynamics as the vehicle 12 is driven over a low friction surface, such as a surface fully or partially coated with standing water, debris, oil, ice, or the like. By contrast, an N$^{th}$ MPC module 92N defines computer executable control logic that may be executed by the system 10 to adapt vehicle dynamics 12 to a set of environmental and/or dynamical conditions experienced when the vehicle 12 is on a dry road surface uncoated by low-friction materials, and the vehicle 12 has a maximum quantity of steering lock applied, i.e. the vehicle 12 is turning as sharply as possible. Outputs of the MPC modules 92A-92N commands to the actuators 52 of the vehicle 12. Once actuators 52 have received commands from the MPC modules 92A-92N, the vehicle 12 dynamical context is obtained once more by the RCNN 65 and the adaptation process begins again.

Turning now to FIG. 2B and with continuing reference to FIGS. 1 and 2A, the system 10 may also operate in a structure having a variety of actuator 52 calibrations 98A-98N stored in a data repository such as a server. As with the example of FIG. 2A, the RCNN 65 takes measurements and estimations from vehicle sensors 64 and actuators, where the measurements and estimations define the vehicle 12 and environmental context, and the context is represented as a fixed length context vector 88 having a length that corresponds to the quantity of sensors 64 and sensor outputs. The vehicle dynamic context from the RCNN 65 is taken as an input to a decider control module 90B. However, unlike the example of FIG. 2A, the system 10 in FIG. 2B utilizes the decider control module 90B to select one or more of the actuator 52 calibrations 98A-98N given the vehicle dynamical context. A single calibration 98A-98N is active at a given point in time, as each calibration 98A-98N defines a separate calibration that is executed by a controller 100 of the system 10 to adapt vehicle 12 dynamics via one or more actuators 52 to a particular set of environmental and/or dynamical conditions.

For example, as shown in FIG. 2B, a first calibration 98A contains actuator 52 settings executable via the controller 100 that are adapted to provide desired vehicle 12 dynamics as the vehicle 12 is driven over a low friction surface, such as a surface fully or partially coated with standing water, debris, oil, ice, or the like. By contrast, an N$^{th}$ calibration 98N defines computer executable control logic that may be executed by the controller 100 of the system 10 to adapt vehicle dynamics 12 to a set of environmental and/or dynamical conditions experienced when the vehicle 12 is on a dry road surface uncoated by low-friction materials, and the vehicle 12 has a maximum quantity of steering lock applied, i.e. the vehicle 12 is turning as sharply as possible.

Outputs of the controller 100 define commands to the actuators 52 of the vehicle 12. Once actuators 52 have received commands from the controller 100, the vehicle 12 dynamical context is obtained once more by the RCNN 65 and the adaptation process begins anew. In each of FIGS. 2A and 2B, the performance of the decider control modules 90A, 90B is tracked using at least tracking error, energy consumption, and current vehicle dynamic state information indices. A weighted sum of the performance indices is output as a reward value r(n).

Figure 3:
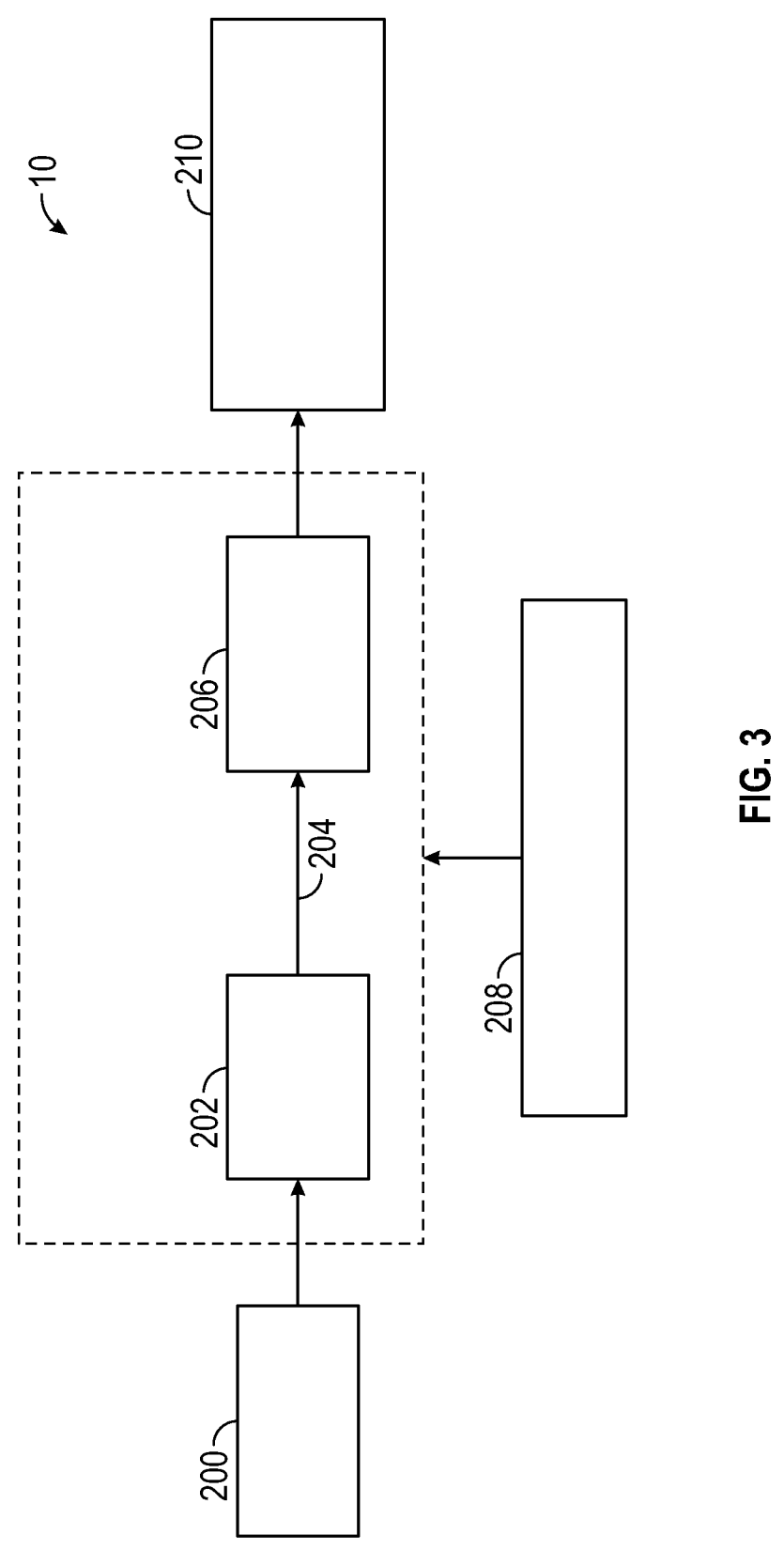
FIG. 3 is a block diagram depicting selection criteria for real-time control selection and calibration within a system and method for real-time control selection and calibration using a Deep Q Network according to an aspect of the present disclosure.

Turning now to FIG. 3, and with continuing reference to FIGS. 1-2B, the system 10 builds vehicle 12 context through a context-builder algorithm 200. The context-builder algorithm 200 is an application 60 stored within memory 56 of the control module 14. The context-builder algorithm 200 generates a summary of vehicle 12 dynamic state information for the past "n" number of seconds. More specifically, the context-builder algorithm utilizes a Deep Q Network (DQN) 202 learning algorithm to generate a Q vector 204 which defines an expected reward value r(n) for each of a given set of actuator 52 commands if each actuator 52 command is given. A policy 206 is applied to the Q vector 204 where, for example, the policy 206 selects the actuator 52 commands that have the maximum reward value r(n). Additional rewards 208 are applied from external sources. The external rewards 208 are derived from key performance indicators (KPI) defining quantifiable progress towards an intended vehicle 12 dynamics state. That is, when actuators 52 commands cause the vehicle 12 dynamic state to improve under a given set of environmental and vehicle context conditions, the external rewards 208 are large or positive, thereby adding weight to the actuator 52 commands, the MPC modules 92A-92N or calibrations 98A-98N for that given set of conditions. By contrast, when actuator 52 commands cause the vehicle 12 dynamic state to deteriorate, become less stable, or less controllable, the external rewards are 208 small or negative, thereby decreasing weight applied to actuator 52 commands given under the given set of conditions. A one-hot action space N-dimensional vector 210 defines an output of the context builder algorithm 200. In several aspects, the N-dimensional vector 210 defines a particular MPC module 92A-92N in FIG. 2A, or a particular calibration or calibration table 98A-98N as depicted and described in FIG. 2B. The context builder algorithm 200 and the system 10, more broadly, automatically select suitable control parameters under different use cases, and offer learning-based control to continue tuning and calibration of control commands to actuators 52 for each set of use cases.

Figure 4:
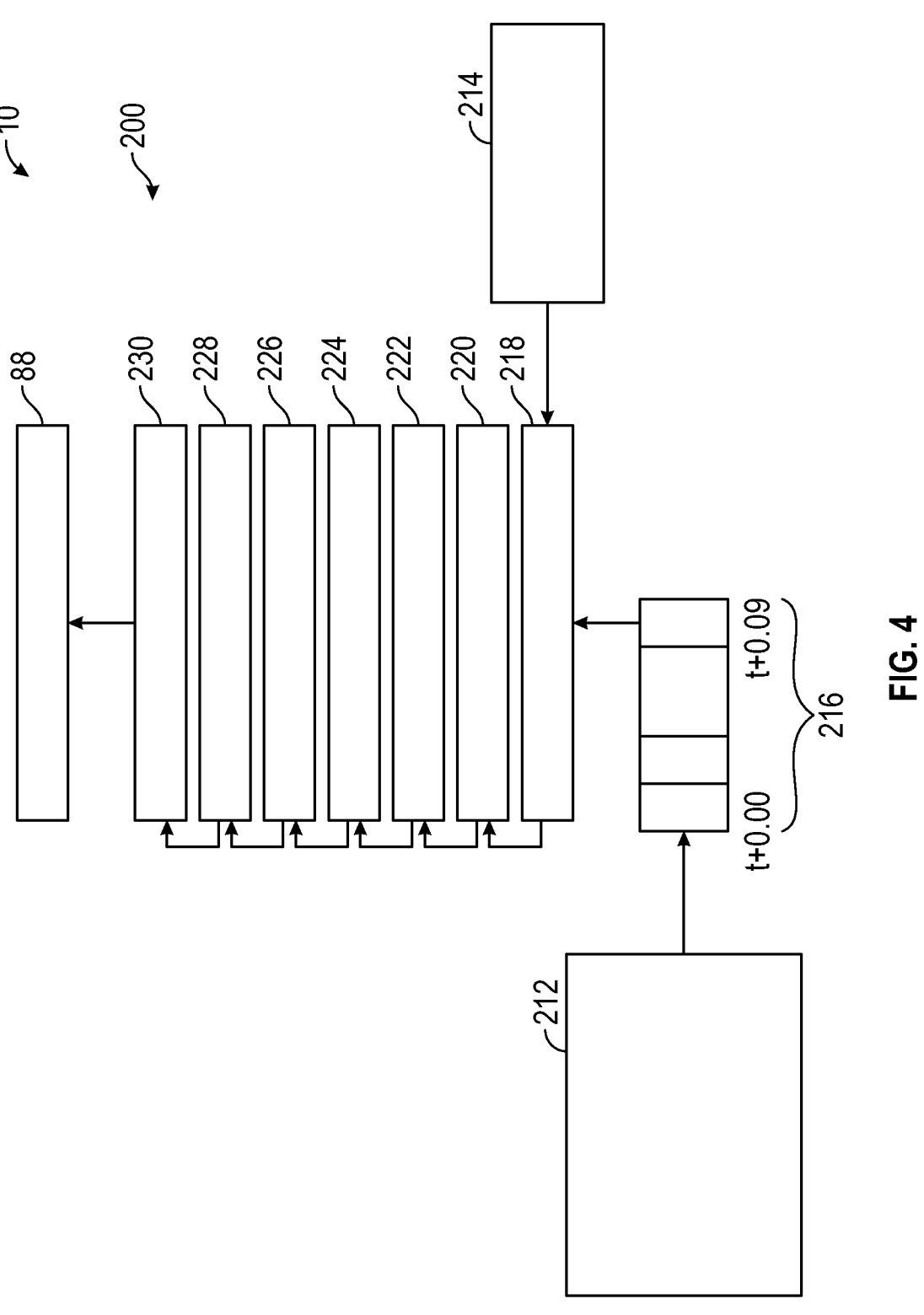
FIG. 4 is a block diagram depicting a context builder portion system and method for real-time control selection and calibration using a Deep Q Network according to an aspect of the present disclosure.

Turning now to FIG. 4 and with continuing reference to FIGS. 1-3, an example of the context builder algorithm 200 of FIG. 3 is shown in additional detail. In several aspects, the context builder algorithm 200 is a deep learning neural network that monitors the sensors 64 and actuators 52 of the vehicle as chassis measurement signal inputs 212 and road surface estimation signal inputs 214 and generates an output in the form of the context vector 88. In some examples, the chassis measurement signals 212 are generated by the sensors 64 and actuators 52 of the vehicle 12 at a predefined rate, such as approximately 100 Hz. The chassis measurement signals 212 may include measurements and/or estimations of vehicle 12 longitudinal velocity $v_x$, lateral velocity $v_y$, yaw rate k, acceleration in a lateral direction $d_y$, acceleration in a longitudinal direction $a_x$, and the like. Similarly, the road surface estimations 214 may be produced by the onboard sensors 64, GPS signals, and perception control logic that utilizes optical information from the sensors 64 to determine or estimate road surface conditions. In several aspects, the road surface estimations 214 are carried out at a predefined rate such as approximately 10 Hz. However, while the predefined rates of chassis measurement signals 212, and road surface estimations 214 have been described as 100 Hz and 10 Hz, respectively, it should be appreciated that the rates may vary substantially. Further, the 100 Hz and 10 Hz signals may be decreased in frequency through buffering processes without departing from the scope or intent of the present disclosure. In further examples, 100 Hz chassis measurement signals 212 may be batch processed into 10 Hz frames 216 and combined with the road surface condition estimation 214 information within a first fully-connected layer 218 of the context builder algorithm 200. The first fully-connected layer 218 processes the chassis measurements 212 and road condition estimation 214 information and generates an output to a leaky rectified linear unit (ReLu) 220. The leaky ReLu 220 sends an output to block 222 where a batch normalization is carried out. An output of the batch normalization at block 222 is received within a recurrent convolutional neural network (RCNN) 224. An output of the RCNN 224 is subsequently processed through a second fully-connected layer 226 before being received in a second leaky ReLu 228. Data identified as extraneous, erroneous, or otherwise undesirable is identified within the second ReLu 228, and a dropped out of calculations at block 230. Once extraneous data has been dropped at block 230, the context vector 88 remains and is used as an input to system 10.

Figure 5:
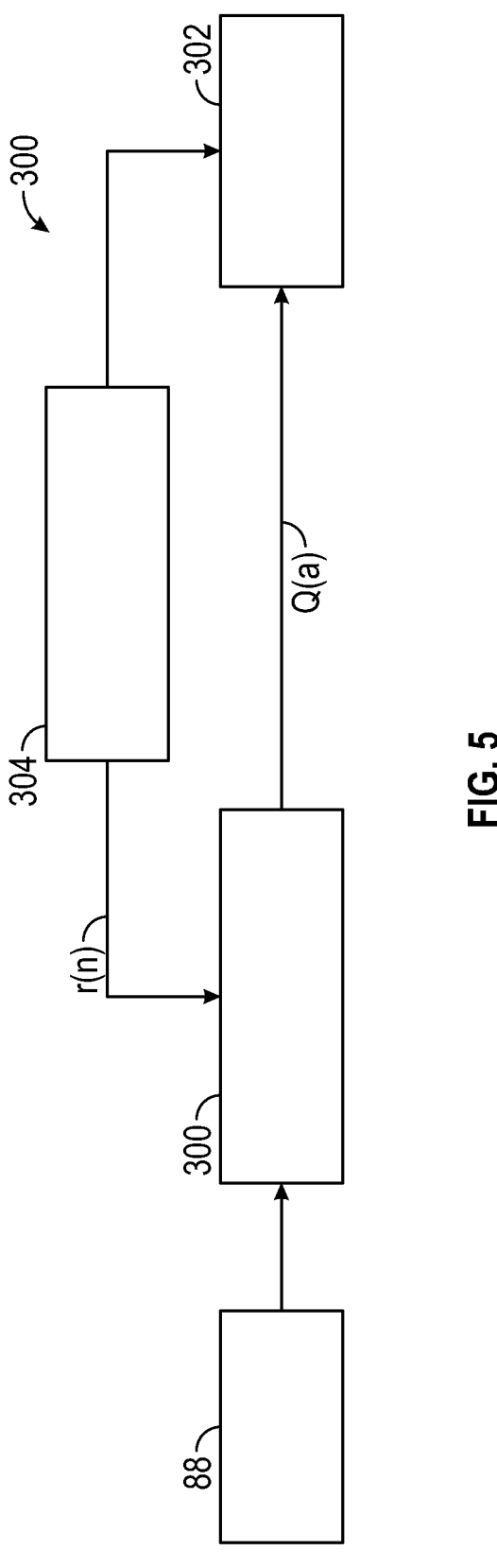
FIG. 5 is a block diagram depicting a training method for real-time control selection and calibration using a Deep Q Network according to an aspect of the present disclosure.

Turning now to FIG. 5 and with continuing reference to FIGS. 1-4, a method of operation of a Deep Q Network (DQN) 300 of the present disclosure is shown in additional detail. The DQN 300 is implemented through multi-layer fully-connected layers. The DQN 300 receives the context vector 88 and generates an expected Q-vector or Q-value $Q(a,\theta)$, where a is the number "N" of the MPC module 92A-92N or calibration 98A-98N selected and $\theta$ is the reward weight to be learned. The Q-vector may, in some examples, range in value from 0 to 1, and where 0.1 is an expected reward value r(n) at Q-vector value 0, and 0.9 is an expected reward value r(n) at Q-vector value 1. A supervised learning process is used to tune 0 such that $\|Q'(a,\theta)-(r+\gamma maxaQ(a,\theta))\|$ is minimized. In several aspects, $Q'(a,\theta)$ is the DQN network to be trained, and $Q(a,\theta)$ is the DQN of the last iteration. $\gamma$ is the discounting factor to handle infinite horizon, and r is the reward r(n) (or penalty) received. More specifically, $\gamma$ defines a discounting factor that increases in size, weight, or the like as time progresses. At block 302 a*=argmax Q(a) is used to define which control systems or actuators 52 should be used to address the current vehicle 12 dynamic state. The control system or actuators 52 selected are actuated according to predetermined settings as described above, and a vehicle 12 or vehicle simulator at block 304 continuously retrieves data from the sensors 64 and actuators 52 to ascertain the vehicle 12 dynamic state as actuator 52 actions occur. From the vehicle 12 or vehicle simulator, a KPI evaluation or reward r(n) is fed into the DQN 300 and applied to future iterations as control signals are sent to the various control systems and/or actuators 52 of the vehicle 12.

Figure 6:
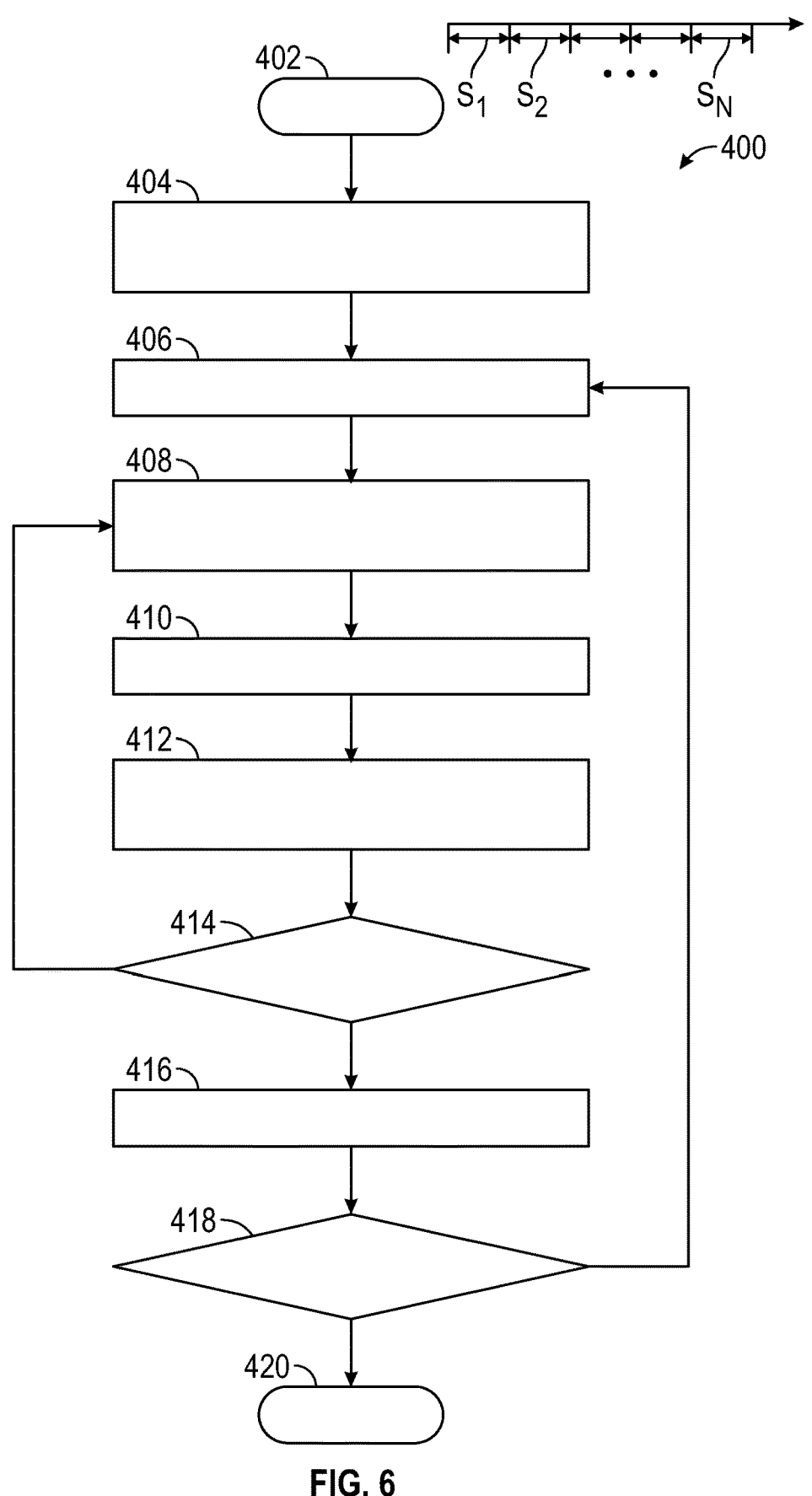
FIG. 6 is a block diagram depicting a flowchart for training the Deep Q Network according to an aspect of the present disclosure.

Turning now to FIG. 6 and with continuing reference to FIGS. 1-5, a method 400 of training the decider control module 90A, 90B using DQN 300 is shown in further detail. The method 400 includes both a training phase and an execution phase. In several aspects, in the training phase, the system 10 partitions vehicle and environmental data from the sensors 64 and actuators 52 into a series of training episode frames $S_1 \ldots S_N$, each of which has predefined fixed length duration. In an example, the training episode frames are each three seconds in duration, though the precise duration of each training episode may vary from application to application without departing from the scope or intent of the present disclosure. The method 400 begins at block 402. At block 404, the system 10 initializes the DQN 300 with a value of Q having random small weights. At block 406, the system 10 sets DQN' to the value of DQN for the vehicle's 12 present dynamic state, given current environmental and vehicle context. At block 408, the training phase begins. For each episodic frame from a replay buffer, the DQN of the vehicle's 12 present dynamic state is stored. The method 400 then proceeds to block 410 where a reward r(n) is computed for the current episode. At block 412, the method 400 trains DQN' to minimize $\|Q'(a,\theta)-(r+\gamma max_aQ(a,\theta))\|$. At block 414, the method 400 determines whether DQN and DQN' have converged to substantially identical values. When the DQN and DQN' have converged, the method 400 proceeds to block 416 and sets DQN to be equal to DQN' for the present episode. However, when the values of DQN and DQN' have not converged, the method 400 proceeds back to block 408 and a new episode commences. From block 416, the method proceeds to block 418 where the method 400 again determines whether DQN and DQN' have converged, and when DQN and DQN' have converged, the method 400 proceeds to block 420 and the method 400 ends. However, when DQN and DQN' have not converged, the method 400 proceeds back to block 406 and sets DQN' equal to DQN for the next episodic iteration. It should be appreciated that Q(a) defines an output of DQN, while Q'(a) defines an output of DQN' where DQN' operates in the training phase, while DQN operates in the execution phase. Further, it should be appreciated that the method 400 may run continuously, periodically, upon the occurrence of a condition, or the like without departing from the scope or intent of the present disclosure.

In several aspects, the system 10 including algorithms 200, 300, and method 400 of the present disclosure may be used in a variety of different situations. In an example, vehicle 12 yaw control using model predictive control (MPC), may be enhanced through simulations and testing using the DQN of the present disclosure so that weights of the MPC may be tuned accurately and calibrated automatically through a variety of testing cases. Likewise, in another example, an active rear steering system may be used to reduce a steering radius of the vehicle 12 at low speeds, improve agility for transient handling situations, and improving stability at steady state, or even offer a "crab" mode for diagonal maneuvering. Multiple MPC control modules 92A-92N or calibrations 98A-98N are necessary to meet various feature or capability requirements of such an active rear steering system. The DQN of the present disclosure may use simulated data or testing data to learn control modes and control actuator 52 selection for each vehicle 12 dynamic state using the active rear steering system.

A system 10 and method 400 for real-time control selection and calibration using DQN of the present disclosure offers several advantages. These include reducing the burden on computational resources, increasing reliability and robustness and redundancy of the system, providing a means to mitigate deterioration of system components and failures while maintaining or reducing complexity, and which improving vehicle motion control capabilities over the lifespan of the vehicle 12, and the lifespans of various vehicle 12 sensors 64 and actuators 52.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for real-time control selection and calibration in a vehicle using a deep-Q network (DQN), the system comprising:

one or more sensors disposed on the vehicle, the one or more of sensors measuring real-time static and dynamic data about the vehicle;

one or more actuators disposed on the vehicle, the one or more actuators altering static and dynamic characteristics of the vehicle;

one or more control modules each having a processor, a memory, and input/output (I/O) ports in communication with the one or more sensors and the one or more actuators, the processor executing program code portions stored in the memory, the program code portions comprising:

a first program code portion that causes the one or more sensors and the one or more actuators to obtain vehicle dynamics information and road surface estimation information;

a second program code portion that utilizes the vehicle dynamics information and road surface estimation information to generate a vehicle dynamical context;

a third program code portion that decides which one of a plurality of predefined calibrations is appropriate for the vehicle dynamical context, including:

program code portions that: refine the vehicle dynamical context by passing the vehicle dynamical context through the DON, the DON having multiple fully-connected layers;

generate an expected Q-value $Q(a,\theta)$, where a is the calibration selected, and $\theta$ is a weight to be learned; and tune the $\theta$ such that a function: $\|Q'(a,\theta)-(r+\gamma maxaQ(a,\theta))\|$ is minimized, where $\gamma$ is a discounting factor that increases with time, and r(n) is a reward received; wherein r(n) is large when the calibration selected achieves a desired vehicle dynamics state, and r(n) is small when the calibration selected does not achieve the desired vehicle dynamics state;

a fourth program code portion that generates an actuator command to the one or more actuators based on a selected one of the plurality of predefined calibrations; and a fifth program code portion that continuously and recursively causes the one or more sensors and the one or more actuators to send vehicle dynamics and road surface estimation information to second program code portion and causes the third, fourth, and fifth program code portions to execute while the vehicle is being operated.

2. The system of claim 1 wherein the second program code portion further comprises program code that:

builds the vehicle dynamical context by passing the vehicle dynamics information and the road surface information through a recurrent convolutional neural network (RCNN).

3. The system of claim 2, wherein the plurality of predefined calibrations further comprises one or more of:

a plurality of model predictive control (MPC) modules, each of the plurality of MPC modules defining program code portions having a predictor and a controller, the predictor containing actuator settings, and the controller executing the actuator settings of the predictor to produce an actuator command; and a plurality of actuator calibrations stored in memory and executed by a single controller to produce an actuator command.

4. The system of claim 3, wherein the third program code portion further comprises program code that:

decides which one of the plurality of predefined calibrations is appropriate for a current vehicle dynamical context by passing the vehicle dynamical context through the DQN, applying a key performance indicator (KPI) reward r(n) to the vehicle dynamical context and selecting a calibration having a maximum possible value among the plurality of predefined calibrations.

5. The system of claim 4 wherein the third program code portion further comprises program code that:

partitions vehicle dynamics information and road surface information into episodic time frames having a predefined duration;

evaluates calibration selection decisions based on performance indices; and computes a weighted sum of performance indices as the reward r(n).

6. The system of claim 5 wherein the performance indices comprise:

tracking error, energy consumption, and current vehicle dynamic state information.

7. The system of claim 1, wherein the third program code portion further comprises:

a training phase, wherein in the training phase:

the DQN is initialized with randomized weights, wherein the randomized weights are applied to each of the plurality of predefined calibrations;

DQN', defining a value of DQN during a current time step, is set to a value of DQN; and for each episodic time frame, a reward r(n) is calculated and DQN' is trained to minimize $\|Q'(a,\theta)-(r+\gamma maxaQ(a,\theta))\|$; and the values of DQN and DQN' are compared; wherein upon determining that the values of DQN and DQN' have converged, the value of DQN is set to DQN', and wherein upon determining the values of DQN and DQN' have not converged, a new reward r(n) is calculated and a new DQN' value is trained to minimize $\|Q'(a,\theta)-(r+\gamma maxaQ(a,\theta))\|$ recursively.

8. The system of claim 7, wherein the third program code portion further comprises:

an execution phase, wherein upon determining that the values of DQN and DQN' have converged, a calibration corresponding to the value of DQN is selected.

9. A method for real-time control selection and calibration in a vehicle using a deep-Q network (DQN), the method comprising:

measuring, by one or more sensors disposed on the vehicle, real-time static and dynamic data about the vehicle;

altering static and dynamic characteristics of the vehicle with one or more actuators disposed on the vehicle;

utilizing one or more control modules each having a processor, a memory, and input/output (I/O) ports in communication with the one or more sensors and the one or more actuators, the processor executing program code portions stored in the memory, the program code portions:

causing the one or more sensors and the one or more actuators to obtain vehicle dynamics information and road surface estimation information;

generating a vehicle dynamical context from vehicle dynamics information and road surface estimation information;

deciding which one of a plurality of predefined calibrations is appropriate for the vehicle dynamical context, wherein deciding which one of a plurality of predefined calibrations is appropriate for the vehicle dynamical context further comprises:

refining the vehicle dynamical context by passing the vehicle dynamical context through the DQN, the DQN having multiple fully-connected layers:

generating an expected Q-value $Q(a,\theta)$, where a is the calibration selected, and $\theta$ is a weight to be learned; and tuning the $\theta$ such that a function: $\|Q'(a,\theta)-(r+\gamma maxaQ(a,\theta)\|$ is minimized, where $\gamma$ is a discounting factor that increases with time, and r(n) is a reward received; wherein r(n) is large when the calibration selected achieves a desired vehicle dynamics state, and r(n) is small when the calibration selected does not achieve the desired vehicle dynamics state;

generating an actuator command to the one or more actuators based on a selected one of the plurality of predefined calibrations; and continuously and recursively obtaining the vehicle dynamics and road surface estimation information, generating the vehicle dynamical context, deciding which one of the plurality of predefined calibrations is appropriate, and generating an actuator command based on a selected one of the plurality of predefined calibrations while the vehicle is being operated.

10. The method of claim 9 wherein generating the vehicle dynamical context further comprises:

building the vehicle dynamical context by passing the vehicle dynamics information and the road surface information through a recurrent convolutional neural network (RCNN).

11. The method of claim 10, wherein deciding which one of a plurality of predefined calibrations is appropriate for the vehicle dynamical context further comprises utilizing one or more of:

a plurality of model predictive control (MPC) modules, each of the plurality of MPC modules defining program code portions having a predictor and a controller, the predictor containing actuator settings, and the controller executing the actuator settings of the predictor to produce an actuator command; and a plurality of actuator calibrations stored in memory and executed by a single controller to produce an actuator command.

12. The method of claim 11, further comprising:

deciding which one of the plurality of predefined calibrations is appropriate for a current vehicle dynamical context by passing the vehicle dynamical context through the DQN, applying a key performance indicator (KPI) reward r(n) to the vehicle dynamical context and selecting a calibration having a maximum possible value among the plurality of predefined calibrations.

13. The method of claim 12 further comprising:

partitioning vehicle dynamics information and road surface information into episodic time frames having a predefined duration;

evaluating calibration selection decisions based on performance indices; and computing a weighted sum of performance indices as the reward r(n).

14. The method of claim 13 wherein evaluating calibration selection decisions further comprises utilizing performance indices including tracking error, energy consumption, and current vehicle dynamic state information.

15. The method of claim 9, wherein deciding which one of a plurality of predefined calibrations is appropriate for the vehicle dynamical context further comprising:

executing a training phase, including:

initializing the DQN with randomized weights, wherein the randomized weights are applied to each of the plurality of predefined calibrations;

setting a value DQN' equal to DQN, wherein DQN' defines the value of DQN during a current time step; and calculating, for each episodic time frame, a reward r(n);

training DQN' to minimize $\|Q'(a,\theta)-(r+\gamma maxaQ(a,\theta))\|$; and comparing the values of DQN and DQN'; wherein upon determining that the values of DQN and DQN' have converged, the value of DQN is set to DQN', and wherein upon determining the values of DQN and DQN' have not converged, a new reward r(n) is calculated and a new DQN' value is trained to minimize $\|Q'(a,\theta)-(r+\gamma maxaQ(a,\theta)\|$ recursively.

16. The method of claim 15, wherein deciding which one of a plurality of predefined calibrations is appropriate for the vehicle dynamical context further comprising:

executing an execution phase, where upon determining that the values of DQN and DQN' have converged, a calibration corresponding to the value of DQN is selected.

17. A system for real-time control selection and calibration in a vehicle using a deep-Q network (DQN), the system comprising:

one or more sensors disposed on the vehicle, the one or more of sensors measuring real-time static and dynamic data about the vehicle;

one or more actuators disposed on the vehicle, the one or more actuators altering static and dynamic characteristics of the vehicle;

one or more control modules each having a processor, a memory, and input/output (I/O) ports in communication with the one or more sensors and the one or more actuators, the processor executing program code portions stored in the memory, the program code portions comprising:

a first program code portion that causes the one or more sensors and the one or more actuators to obtain vehicle dynamics information and road surface estimation information;

a second program code portion that utilizes the vehicle dynamics information and road surface estimation information to generate a vehicle dynamical context, wherein the vehicle dynamical context is generated by passing the vehicle dynamics information and the road surface information through a recurrent convolutional neural network (RCNN), the RCNN including a plurality of model predictive control (MPC) modules, each of the plurality of MPC modules defining program code portions having a predictor and a controller, the predictor containing actuator settings, and the controller executing the actuator settings of the predictor to produce an actuator command; and a plurality of actuator calibrations stored in memory and executed by a single controller to produce an actuator command;

a third program code portion that decides which one of a plurality of predefined calibrations is appropriate for the vehicle dynamical context; wherein the third program code portion decides which one of the plurality of predefined calibrations is appropriate for a current vehicle dynamical context by passing the vehicle dynamical context through the DQN, applying a key performance indicator (KPI) reward r(n) to the vehicle dynamical context and selecting a calibration having a maximum possible value among the plurality of predefined calibrations; partitions vehicle dynamics information and road surface information into episodic time frames having a predefined duration; evaluates calibration selection decisions based on performance indices; and computes a weighted sum of performance indices as the reward r(n), wherein the performance indices comprise: tracking error, energy consumption, and current vehicle dynamic state information; wherein the third program code portion refines the vehicle dynamical context by passing the vehicle dynamical context through the DQN, the DQN having multiple fully-connected layers; generates an expected Q-value $Q(a,\theta)$, where a is the calibration selected, and $\theta$ is a weight to be learned; and tunes the $\theta$ such that a function: $\|Q'(a,\theta)-(r+\gamma maxaQ(a,\theta))\|$ is minimized, where $\gamma$ is a discounting factor that increases with time, and r(n) is a reward received; wherein r(n) is large when the calibration selected achieves a desired vehicle dynamics state, and r(n) is small when the calibration selected does not achieve the desired vehicle dynamics state;

a fourth program code portion that generates an actuator command to the one or more actuators based on the one of a selected one of the plurality of predefined calibrations; and a fifth program code portion that continuously and recursively causes the one or more sensors and the one or more actuators to send vehicle dynamics and road surface estimation information to second program code portion and causes the third, fourth, and fifth program code portions to execute while the vehicle is being operated.

18. The system of claim 17, wherein the third program code portion further comprises:

a training phase, wherein in the training phase:
the DON is initialized with randomized weights, wherein the randomized weights are applied to each of the plurality of predefined calibrations;
DQN', defining the value of DQN during a current time step, is set to the value of DQN; and
for each episodic time frame, a reward r(n) is calculated and DQN' is trained to minimize $\|Q'(a,\theta)-(r+\gamma maxaQ(a,\theta))\|$; and
the values of DQN and DQN' are compared; wherein upon determining that the values of DQN and DQN' have converged, the value of DQN is set to DQN', and wherein upon determining the values of DQN and DQN' have not converged, a new reward r(n) is calculated and a new DQN' value is trained to minimize $\|Q'(a,\theta)-(r+\gamma maxaQ(a,\theta))\|$ recursively; and an execution phase, wherein upon determining that the values of DQN and DQN' have converged, a calibration corresponding to the value of DQN is selected.

*    *    *    *    *